United States Patent

Doi et al.

[11] Patent Number: 5,226,500
[45] Date of Patent: Jul. 13, 1993

[54] AUTOMOTIVE POWER UNIT MOUNTING SYSTEM

[75] Inventors: Kazuhiro Doi; Hirofumi Aoki; Shigeki Sato; Yoshiharu Nakaji; Tsutomu Hamabe, all of Kanagawa, Japan

[73] Assignee: Nissan Motor Co., Ltd., Yokohama, Japan

[21] Appl. No.: 973,529

[22] Filed: Nov. 9, 1992

Related U.S. Application Data

[63] Continuation of Ser. No. 642,881, Jan. 18, 1991, abandoned.

[30] Foreign Application Priority Data

Jan. 18, 1990 [JP]  Japan ....................................... 2-8778

[51] Int. Cl.$^5$ ........................ B62D 21/00; F16F 9/00
[52] U.S. Cl. ................................ 180/312; 267/140.12; 267/140.15
[58] Field of Search ............... 180/300, 312, 292, 902, 180/291; 267/219, 140.14, 140.15, 140.12

[56] References Cited

U.S. PATENT DOCUMENTS

| | | | |
|---|---|---|---|
| 4,909,489 | 3/1990 | Doi | 267/140.1 |
| 4,919,402 | 4/1990 | Doi | 267/140.1 |
| 4,928,935 | 5/1990 | Matsui | 267/140.1 |
| 4,941,649 | 7/1990 | Funahashi et al. | 267/140.1 C |
| 4,971,299 | 11/1990 | Doi | 267/140.1 C |
| 4,991,826 | 2/1991 | Hoying et al. | 267/140.1 AE |
| 5,009,402 | 4/1991 | Sato | 267/140.1 AE |
| 5,052,662 | 10/1991 | Doi | 180/312 X |
| 5,060,919 | 10/1991 | Takano et al. | 180/312 X |

FOREIGN PATENT DOCUMENTS

| | | |
|---|---|---|
| 0211173 | 2/1987 | European Pat. Off. . |
| 0290181 | 11/1988 | European Pat. Off. . |
| 3336965 | 5/1985 | Fed. Rep. of Germany . |
| 3705579 | 9/1988 | Fed. Rep. of Germany . |
| 3836355 | 5/1989 | Fed. Rep. of Germany ... 267/140.1 C |
| 2379732 | 9/1978 | France . |
| 2642489 | 8/1990 | France . |
| 60-104828 | 6/1985 | Japan . |
| 61207212 | 2/1987 | Japan . |
| 0009021 | 1/1989 | Japan .................................. 180/312 |
| 0150035 | 6/1989 | Japan .......................... 267/140.1 C |
| 0102944 | 4/1990 | Japan .......................... 267/140.1 C |
| 1020851 | 2/1966 | United Kingdom . |
| 1282568 | 7/1972 | United Kingdom . |
| 2061453 | 5/1981 | United Kingdom . |
| 2071810 | 9/1981 | United Kingdom . |
| 2122052 | 1/1984 | United Kingdom . |
| 2216226 | 10/1989 | United Kingdom . |

Primary Examiner—Brian Johnson
Attorney, Agent, or Firm—Leydig, Voit & Mayer

[57] ABSTRACT

A vibration sensor is disposed at an evaluation point on the vehicle floor proximate the driver's seat. This sensor, in combination with one disposed on a electrically controllable engine mount, is used to determine the magnitude and orientation of a vector of vibration which reaches the evaluation point and which combines with other vibrational vectors in a manner which results in the generation of vibration at the evaluation point. A mount control signal is controlled in a manner which modifies the vibration vector and attenuates the vibration at the evaluation point.

11 Claims, 12 Drawing Sheets

AUTOMOTIVE POWER UNIT MOUNTING SYSTEM

This application is a continuation of application Ser. No. 07/642,881, filed Jan. 18, 1991 now abandoned.

BACKGROUND OF THE INVENTION

1. Field of the Invention

The present invention relates generally to a mounting arrangement for an automotive power unit and more specifically to such a mounting arrangement which utilizes electrorheopectic fluid-filled bushes and which features control by a remotely mounted vibration sensor or sensors.

2. Description of the Prior Art

JP-A-60-104828 discloses a previously proposed engine mount which includes a main working chamber the volume of which varies with the distortion of an elastomeric member which defines a part of the same and which acts as a spring. The main working chamber communicates with a variable volume auxiliary chamber via an orifice passage. The main and auxiliary chambers are filled with an ERF and the orifice passage lined with electrodes by which the viscosity of the ERF contained therein can be controlled.

A similar type of arrangement is disclosed in U.S. Pat. No. 4,928,935 issued on May 29, 1990 in the name of Matsui. The aim of this type of arrangement is to provide relatively long orifice passages between the working chamber and an expansion chamber in which the slugs of ERF can be induced to undergo resonance in the absence of any voltage impression on the electrodes disposed therein, and in response to vibration such as generated during engine idling. This arrangement allows the dynamic spring constant of the mount to be reduced in a manner which enables the transmission of vibration from the power unit to the vehicle chassis to be greatly attenuated. By selectively impressing a voltage on the electrodes disposed in the above mentioned "long" orifice passages it is possible to vary the dynamic spring constant of the mount in a manner which enables different frequency vibrations to be damped.

While the above described devices have proven relatively effective, an automotive power unit is inevitably supported by a plurality of mounts and it is not always possible to effectively damp the transmission of engine vibration to the vehicle chassis simply by varying the dynamic spring constant in accordance with a parameter indicative of the frequency of the vibration which is being produced by the engine.

SUMMARY OF THE INVENTION

As will be appreciated, some engine mounts will be exposed to engine rolling while others are exposed to different forms of vibrational movement. In other words, each of the plurality of mounts which are used to suspend the power unit on the chassis tends to be subject to different vibrational environments. Accordingly, the vibration at any given point on the vehicle chassis tends to be a result of the sum of a number of different vibrational "vectors", each of which originates at a different engine mount.

Accordingly, it is an object of the present invention to provide a control system for an engine suspension arrangement which employs electrically controllable engine mounts (including those which employ ERF), which system monitors the vibration at selected evaluation sites and determines the application of control signals to the electrically controllable bush or bushes based on an analysis of the various vibrational vectors which sum at the evaluation point.

In brief, the above object is achieved by an arrangement wherein a vibration sensor is disposed at an evaluation point on the vehicle floor proximate the driver's seat. This sensor, in combination with one disposed on an electrically controllable engine mount, is used to determine the magnitude and which combines with other vibrational vectors in a manner which results in the generation of vibration at the evaluation point, and is also used to control the generation of a mount control signal in a manner which modifies the vibration vector and attenuates the vibration at the evaluation point.

More specifically, an automotive power unit mounting system according to the present invention includes a power unit which is supported on a chassis at a plurality of suspension points; a first electrically controllable mount which is disposed at a first of the plurality of the suspension points and which supports the power unit on the chassis, the first mount being responsive to a first electric control signal applied thereto; a first vibration sensor for sensing the vibration at a first predetermined vibration evaluation location on the chassis whereat vibration occurs due to the operation of the power unit, the evaluation point being remote from the plurality of suspension points; and means for generating the first control signal to be applied to the first mount in a manner which attenuates a resultant vector equal to a sum of vibration vectors which are transmitted to the evaluation point from the plurality of suspension points.

DETAILED DESCRIPTION OF THE PREFERRED EMBODIMENTS

Figure 1:
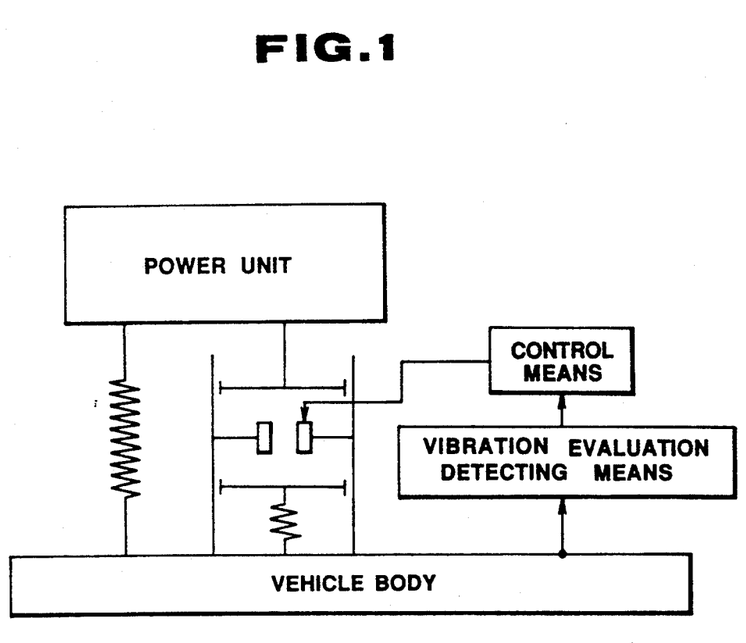
FIG. 1 is a schematic diagram conceptually depicting arrangement of the present invention.
Figure 2:
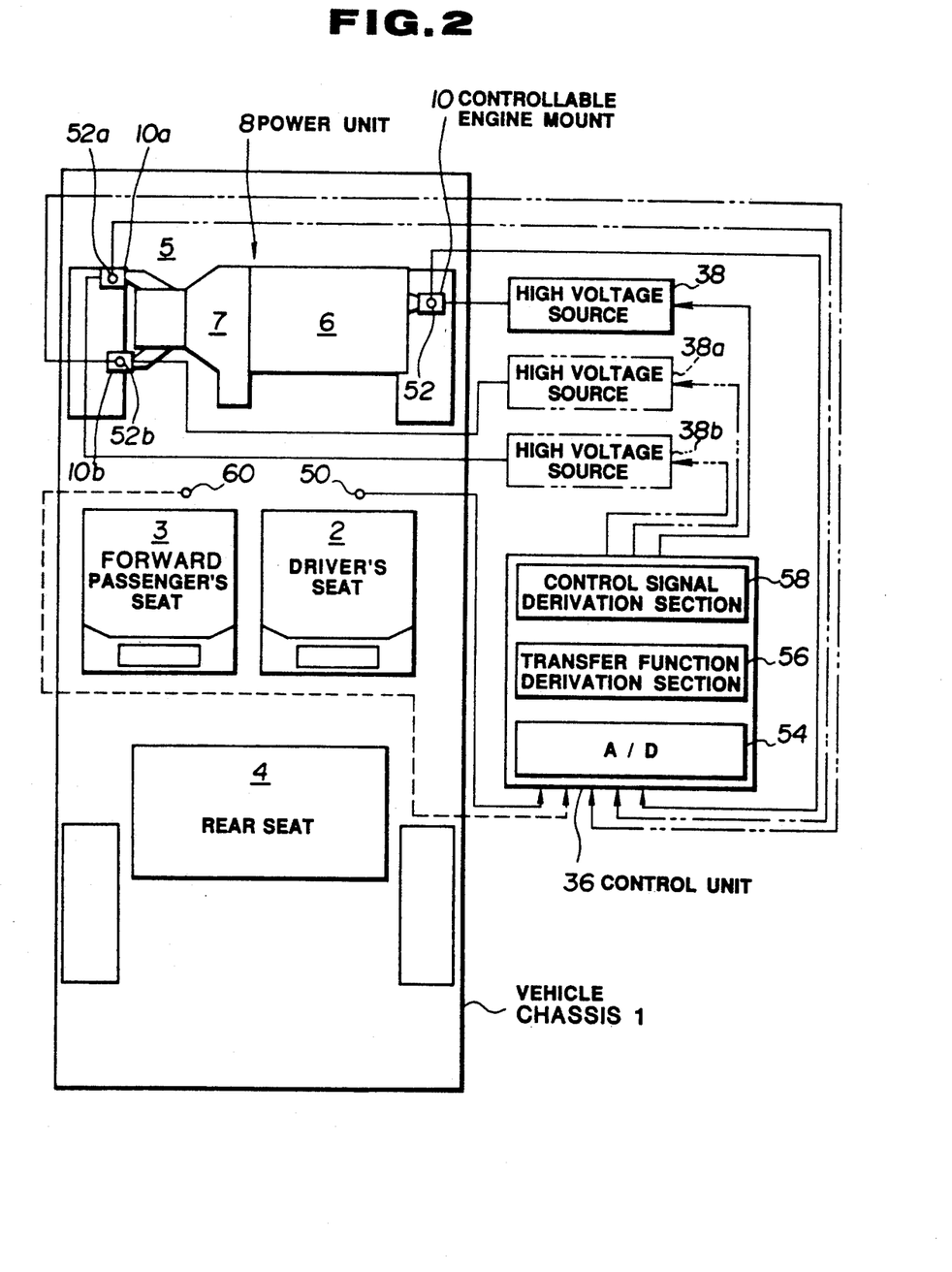
FIG. 2 is a schematic diagram showing the arrangement of a first embodiment of the present invention.

FIG. 2 schematically shows an arrangement to which the embodiments of the present invention are applicable. In this drawing 1 denotes a vehicle chassis, 2 a driver's seat, 3 a front passenger's seat, 4 a rear passenger's seat, 5 an engine room, 6 an engine, and 7 torque transmission device which includes an automatic transmission and torque converter, or the like.

As will be noted the engine 6 and transmission 7 are connected to define a single power unit 8 which is supported on the chassis 1 by way of engine mounts 10, 10a and 10b. In accordance with the first embodiment of the invention only engine mount 10 is electrically controllable. In this embodiment, mount 10 has a construction of the nature shown in FIG. 3. As will be appreciated from this figure, mount 10 comprises an inner hollow shaft 12, an outer tubular member 14; and an elastomeric body 16 which is operatively disposed between the inner and outer members in manner to act as a spring and which is vulcanized to the inner shaft 12.

Figure 3:
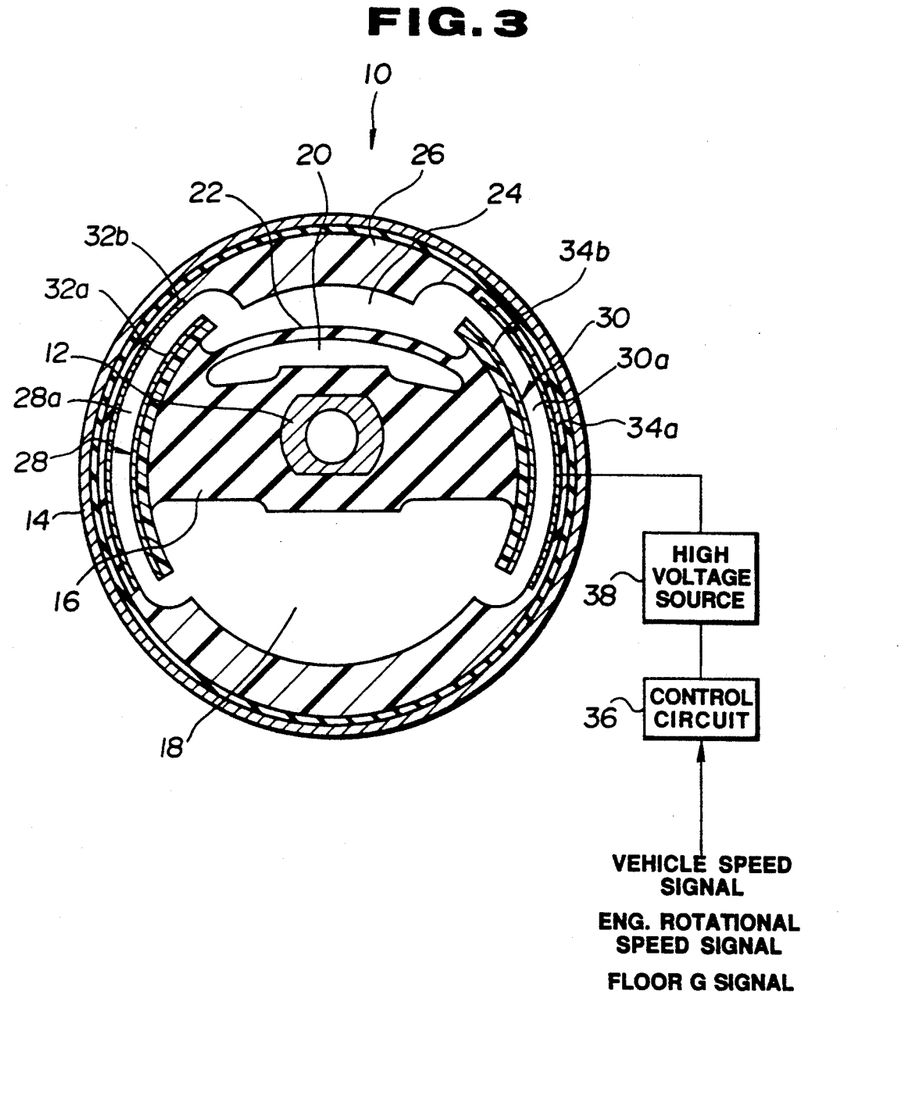
FIG. 3 is a transverse cross-sectional view of an electrically controllable bush which is used in conjunction with the present invention.

The inner shaft 12 is adapted to be connected to one of the vehicle chassis 1 and the power unit 8 while the outer member is adapted to be connected via a suitable bracket or the like to the other of the chassis and power unit.

The elastomeric body 16 is formed with voids which define a main working chamber 18 which is located below the inner shaft 12, an auxiliary chamber 24, and an air chamber 20. A flexible diaphragm 22 hermetically separates the air and auxiliary chambers 20, 24.

An annular spacer 26 is disposed between the inner and outer members 12, 14 in a manner which defines electrode orifice arrangements 28 and 30. These orifice arrangements comprise two essentially equal-length arcuate passages 28a, 30a and pairs of electrode plates 32a, 32b & 34a, 34b.

A high voltage source 38 is electrically connected with the above mentioned electrode plates. This source 38 is controlled by a control circuit 36 which is supplied with inputs from vehicle speed, engine speed, and floor G sensors.

The dimensions of the orifice passages 28a and 30a are selected to adjust the mass of liquid therein to a value which, in combination with the expansion characteristics of the main working chamber 20, induces the liquid in the passages to undergo resonance when the second harmonic of the vibration which is applied to the mount falls in the 20–30 Hz frequency range (viz., a vibration frequency which is mainly generated when a 4 or 8 cylinder engine idles at 600–900 RPM).

Figure 4:
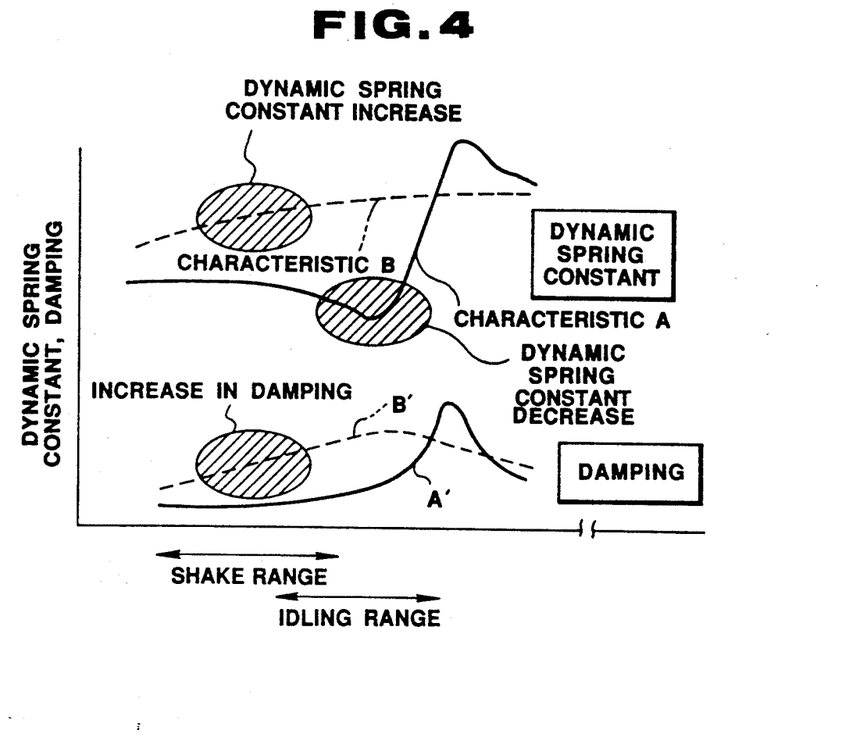
FIG. 4 is a graph which shows the operational characteristics of the mount shown in FIG. 3 in terms of dynamic spring constant and damping effect.

Trace A of FIG. 4 shows the dynamic spring constant/frequency characteristics which are produced with the above described mount when the ERF is conditioned to exhibit a low viscosity (viz,. voltage OFF) while trace B shows the characteristics produced when a voltage is impressed on the electrodes (voltage ON) in the orifice passages and the viscosity of the ERF is raised to a very high level. On the other hand, trace A' denotes the vibration transmission phase characteristics which are produced by the mount when no voltage (voltage OFF) is applied to the electrode plates, while trace B' denotes the characteristics which are produced when a high voltage (voltage ON) is applied.

In the instant embodiment, a point which is proximate the driver's seat 2 is selected as the site at which vibration which is being transmitted from the power unit 8 should be evaluated. In this case a vibration sensor in the form of an accelerometer 50 is used to detect the acceleration of the floor panel on which it is mounted and supply a signal indicative of the same to the control unit 36. In addition, a vibration sensor in the form of a unit lateral accelerometer 52 is mounted on the electrically controllable mount 10 and arranged to supply a signal indicative of the sensed unit lateral acceleration to the control unit 36.

The control unit 36 is also arranged to receive the previously mentioned data inputs from vehicle speed and engine speed sensors (not shown).

The control unit 36 includes an A/D converter 54, a transfer function derivation section 56, and a control signal derivation section 58. As will be readily appreciated, the latter two elements are in fact constituted by a microprocessor and are schematically illustrated in block diagram form merely for the sake of convenience.

The outputs of the accelerometers 50, 52 are read in, and based on this data, the vector of the vibration component which is being transmitted to the evaluation point via the engine mount 10 is derived.

For example, if the the output of unit lateral accelerometer 52 indicates a vibration having a phase ∂1 and an amplitude x, the output of the accelerometer 50 is phase ∂3 and acceleration g, and given that this input vibration is transmitted via the engine mount 10 which exhibits phase ∂2 and load F vibration characteristics, then it is possible to derive the vector of the vibration which is being transmitted to the evaluation point.

Figure 5:
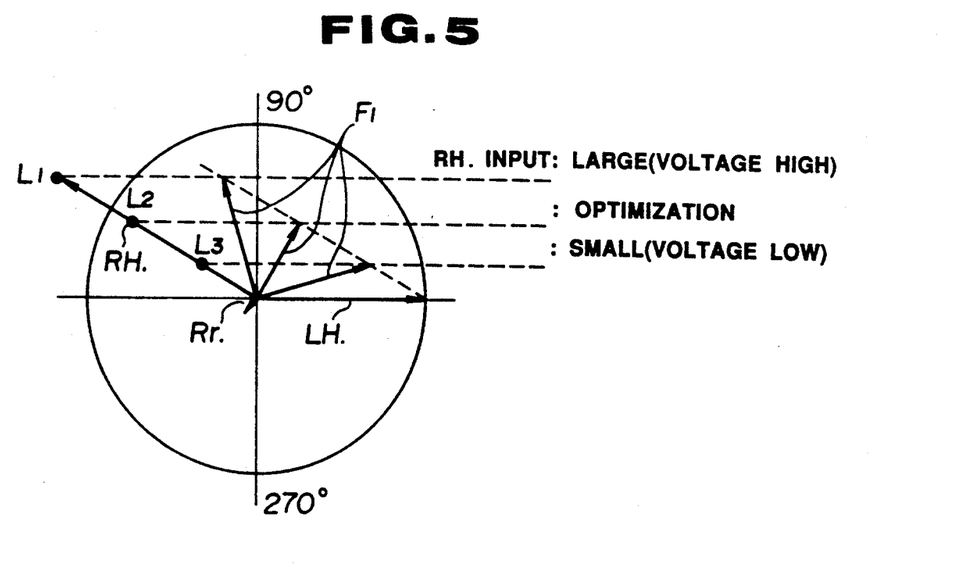
FIG. 5 is a vector diagram which demonstrates the manner in which control according to the first embodiment of the present invention is executed.

In FIG. 5 the above mentioned vector is illustrated as vector RH because the engine mount 10 is located to the right of the accelerometer 50 and the angle of the vector is given by the phase value ∂3 while the length of the same is determined in accordance with the value of g.

It should be noted that vibration having a vector LH is transmitted to the evaluation point from an engine mount 10a located at the front left of the power unit 8 while vibration having a vector Rr is received from the mount 10b located at the rear left of the same. The magnitudes of these latter two vectors can be determined based on empirical data.

Accordingly, the vibration which is experienced by the person seated in the driver's seat can be shown to be due to a resultant vector F1 which is derived by summing the above mentioned vectors RH, LH and Rr.

By controlling the level of the signal applied to the engine mount 10, it is possible to vary the viscosity of the ERF in the orifice passage 28a and 30a and thus vary the dynamic spring constant of the mount 10. This enables the magnitude of the vector RH to be controlled and hence enables the magnitude of the resultant vector F1 to be also controlled.

That is to say, by impressing a voltage on the electrodes plates of the mount 10 and subjecting the acceleration (GRH) sensed at the mount 10 and that sensed at the evaluation point (GFR) to FFT (Fast Fourier Transform) type frequency analysis in the control unit 36, it is possible to derive, with reference to the engine speed, the level of the engine speed second harmonic component vibration acceleration which causes trouble during engine idling and the vibration phase by establishing one vibration as a reference.

The engine mount acceleration level is converted to a displacement level and thus results in a displacement vector XRH.

Thus, assuming the dynamic spring constant is KRH during the time a voltage is being impressed on the electrode plates (i.e., voltage ON) then the force applied to the vehicle chassis is given by XRH·KRH, and assuming that the transfer function of the chassis between the XRH·KRH input point and the evaluation point is HRH−RH, and the acceleration vector which is input from a source or sources other than the mount 10 is GWO, RH, the vibrational acceleration of the floor proximate the driver's seat GFR can be expressed as follows:

$$GFR = XRH \cdot KRH \cdot HRH - RH + GWO, RH \quad (1)$$

In the case that a voltage is not applied to the electrode plates (i.e., voltage OFF), as the vectors do not change except that of the engine mount, the following relationship is obtained:

$$G'FR = X'RH \cdot K'RH \cdot HRH - RH + GWO, RH \quad (2)$$

If the dynamic spring constant of the mount is empirically determined during ON and OFF states, the unknowns HRH−RH and GWO,RH in eqns. (1) and (2) can be obtained.

Accordingly, the acceleration vector GFR,RH which results from the vibration which is input from the engine mount 10 and which constitutes one of the vibrations which reaches the floor proximate the driver's seat during idling (volt OFF) is expressed as follows:

$$GFR.RH = X'RH \cdot K'RH \cdot HRH - RH \quad (3)$$

Therefore, if the transfer function between the engine mount 10 and the floor proximate the driver's seat is derived using the ON and OFF vibration accelerations, it is possible to determine the vibration vector which results from the vibration input to the vehicle chassis via the engine mount and which reaches the floor proximate the driver's seat.

Figure 6:
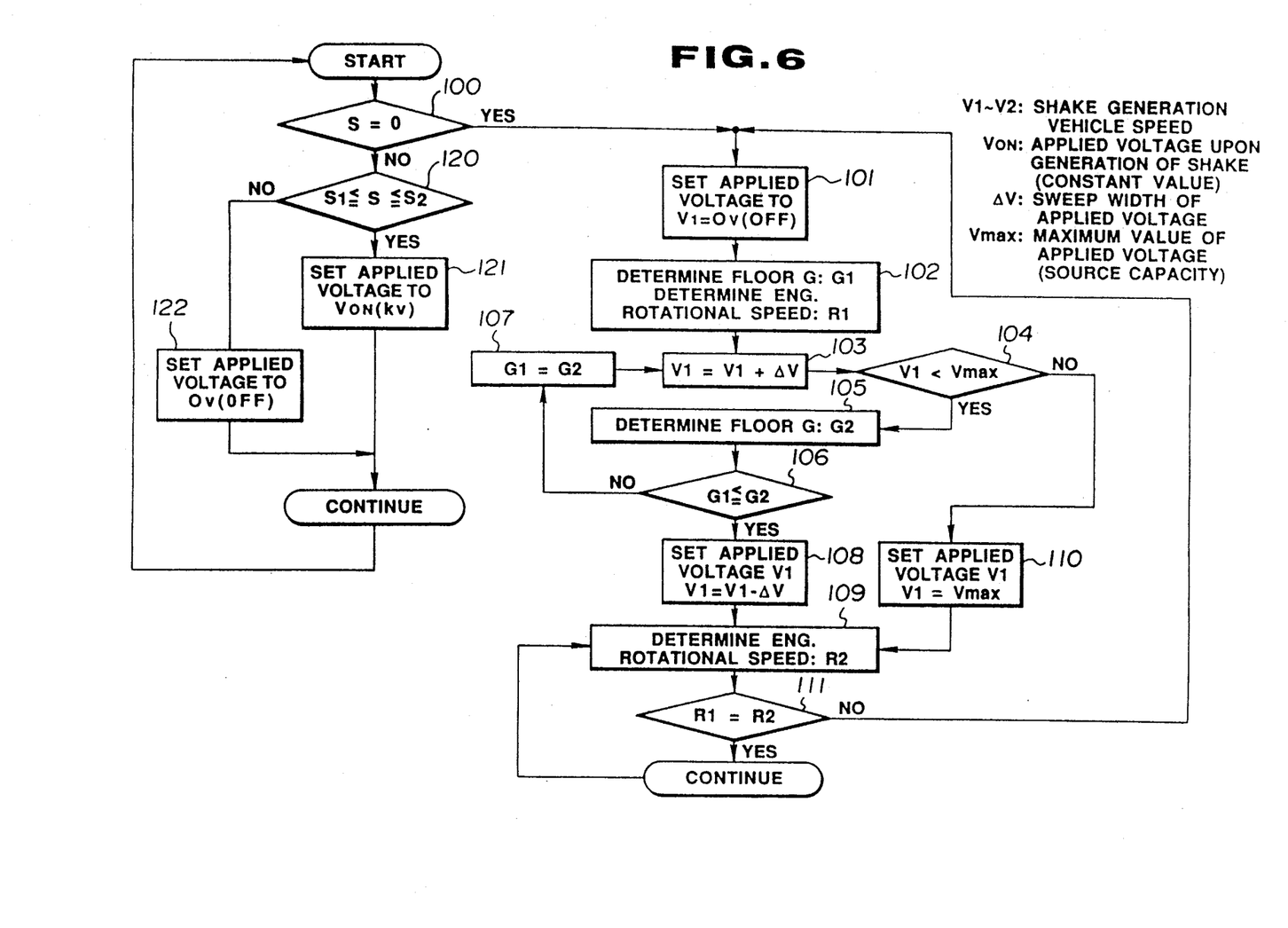
FIGS. 6 is a flow chart which depicts a control routine executed in accordance with a first embodiment of the present invention.

The control which is particularly directed to control during idling and engine shake vibration ranges and which is implemented by the instant embodiment will become better understood from the following discussion of an algorithm which is depicted in flow chart form in FIG. 6.

The first step 100 of the routine which implements the algorithm is such as to sample the engine speed input and determine if the vehicle is moving or not, and therefore determine if engine idling or engine shake control is required. If the vehicle is at a standstill (S=0) indicating the need for idling control, then the routine flows across to step 101 wherein the voltage which is applied to the electrode plates of the engine mount 10 is set to zero (V1=0v (OFF)). Following this, in step 102 the acceleration at the evaluation point as indicated by the output of accelerometer 50 and the engine speed are read and memorized as values G1 and R1, respectively.

In steps 103 and 104 the voltage which is applied to the electrode plates is incrementally increased by a sweep width value ΔV and then compared with a predetermined value Vmax. If the instant value of V1 is less than Vmax the routine flows to step 105 wherein the acceleration or G at the evaluation point is re-determined and recorded as G2. In step 106, the current values of G1 and G2 are compared. If G1 is greater than G2 then the routine loops back to step 107 wherein G1 is set equal to G2 and in step 103 the voltage is further incrementally increased. However, if the outcome of step 104 is such as to indicate that V1=Vmax, then the routine flows to step 110 wherein the value of V1 is set to Vmax.

On the other hand, if G1≦G2 then in step 108 the voltage V1 which is being impressed on the electrode plates is decremented by an amount ΔV. Following this, in step 109 the engine speed is read and stored as R2. In step 111, R1 and R2 are compared. Until the values differ, the routine loops back to step 109. Upon R1≠R2 the routine loops back to step 101 wherein the voltage which is applied to the electrode plates is reset to zero.

Accordingly, while the engine is idling and the vehicle is at standstill, the vibration which occurs in the floor proximate the driver's seat is measured and attenuated by incrementally changing the voltage which is applied to the engine mount 10.

That is to say, as the engine mount 10 exhibits the characteristics shown in FIG. 4, the above described voltage control causes both the dynamic spring constant and the damping rate (phase) to simultaneously vary, so the conditions under which vibration is transmitted from the engine mount 10 to the evaluation point can be varied. As a result it is possible to control the length and the angle of the vector RH.

That is to say, the vibration vector RH which is depicted in FIG. 5 can be shortened (absolute length reduced) and some change in phase can be produced by increasing the dynamic spring constant. It will also be appreciated that the resultant vector F1 which appears at the evaluation point assumes a minimum value when the length of vector RH is reduced to L2.

Accordingly, if the dynamic spring constant is increased by selectively applying a controlled voltage during the normally OFF state, vibration in the vicinity of the driver's seat can be effectively attenuated.

On the other hand, when engine shake control is implemented by the routine depicted in FIG. 6, in response to an S≠0 indication in step 100, then in step 120 it is determined if the vehicle speed S falls in the speed range S1-S2 or not. If the outcome of this step is affirmative, then the routine flows to step 121 wherein a high voltage is applied to the electrode plates of the orifice passage arrangements 28, 30. This induces the viscosity of the ERF in the orifice passages 28a and 30a to assume a very high viscosity and stick in a manner which effectively closes the same. As a result, the dynamic spring constant undergoes a large increase and the engine shake is markedly attenuated.

However, if the outcome of step 120 is such as to indicate that the vehicle speed is out of the range in which engine shake is apt to take place, then the routine flows to step 122 wherein a command which sets the voltage level to zero is issued. In response to this setting, the viscosity of the ERF in the passages 28a and 30a is reduced to a low level thus reducing the dynamic spring constant of the mount and conditioning the same to effectively absorb power unit 8 vibration.

SECOND EMBODIMENT

Figure 7:
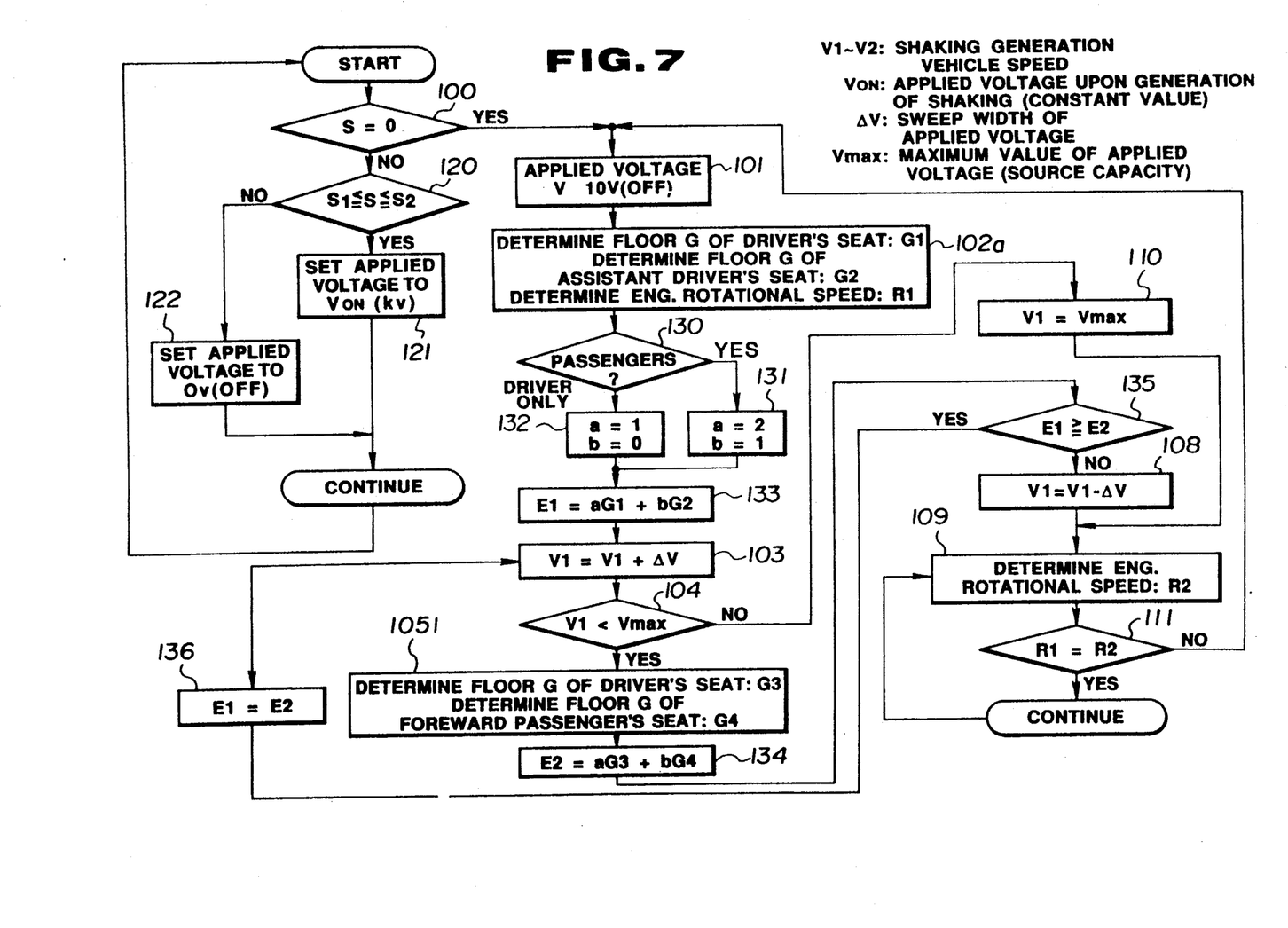
FIGS. 7, 8A, 8B, 9, and 10 are flow charts which depict control routines which are executed in accordance with second to fourth embodiments of the present invention.

FIG. 7 shows in flow chart form a routine performed by a second embodiment of the present invention. In this embodiment use is made of another vibration sensor in the form of a second accelerometer 60 which, as shown in FIG. 2, is disposed on the vehicle floor proximate the front passenger's seat 3 so as to establish a second evaluation point.

In this embodiment the data derived by using the two accelerometers 50 and 60 is used in the control unit 36 to enable weighting of the results derived and thus enable a further increase in the attenuation of the vibration proximate the driver's seat 2.

It will be noted that steps which are common to the routine shown in FIG. 6 are denoted by like numerals and no description of the same is given for brevity.

Following an indication that the vehicle is at a standstill (step 100) and setting of the voltage which is applied to the electrode plates to zero (step 101), the routine goes to step 1021. In this step the accelerations of the floor proximate the driver's seat and proximate the front passenger's seat are determined and recorded as G1 and G2, respectively. The engine speed is also read and recorded as R1. Following this, the routine determines in step 130 if a person is seated on the front passenger's seat or not. This determination can be made by checking the status of front passenger's seat belt, a weight sensor which is responsive to a predetermined load being placed on the seat, or the like.

In the event that a passenger is detected as being seated on the front passenger's seat, the routine goes to step 131 wherein the accelerometer data is weighted. By way of example, the data pertaining to the driver's seat can be assigned a weighting factor $a=2$ while that of the front passenger's seat given a weighting factor of $b=1$.

However, if no passenger is detected on the front passenger's seat the routine proceeds to step 132 wherein the driver's seat data weight factor a is set to "1" and that of the front passenger's seat (b) set to "0".

In step 133 an evaluation function is derived using the weighting factors derived in whichever of steps 131 and 132 the routine was induced to pass through, using the following equation:

$$E1 = aG1 + bG2 \tag{4}$$

Following this, the routine goes to step 103 wherein the applied voltage is incremented by the incremental value $\Delta V$. In step 104 it is determined if $V1 < Vmax$. If the outcome is affirmative the routine flows to 1051 wherein the outputs of the accelerometers are read again and the values recorded as G3 and G4.

At step 134 a second evaluation function is derived using equation 5. Viz,:

$$E2 = aG3 + bG4 \tag{5}$$

In step 135 the values of E1 and E2 are compared. If $E1 \geq E2$ the routine flows to step 136 wherein the value of E1 is set equal to E2 and then the routine loops back to step 103. However, if $E1 < E2$ the routine goes to step 108 wherein the applied voltage is decremented by $\Delta V$.

Accordingly, in this embodiment as two evaluation points are employed it is possible reduce the vibration level at both of the front seats 2, 3. Further, as the data derived from the accelerometer 60 are used to weight the data derived from accelerometer 50, the vibration at the driver's seat can be attenuated even more effectively than in the case of the first embodiment.

It is of course within the scope of the present invention to use more than two accelerometers, and inputs from 3 or more can be used to enable the data derived from the others to be weighted in the manner disclosed above.

THIRD EMBODIMENT

Figure 8A:
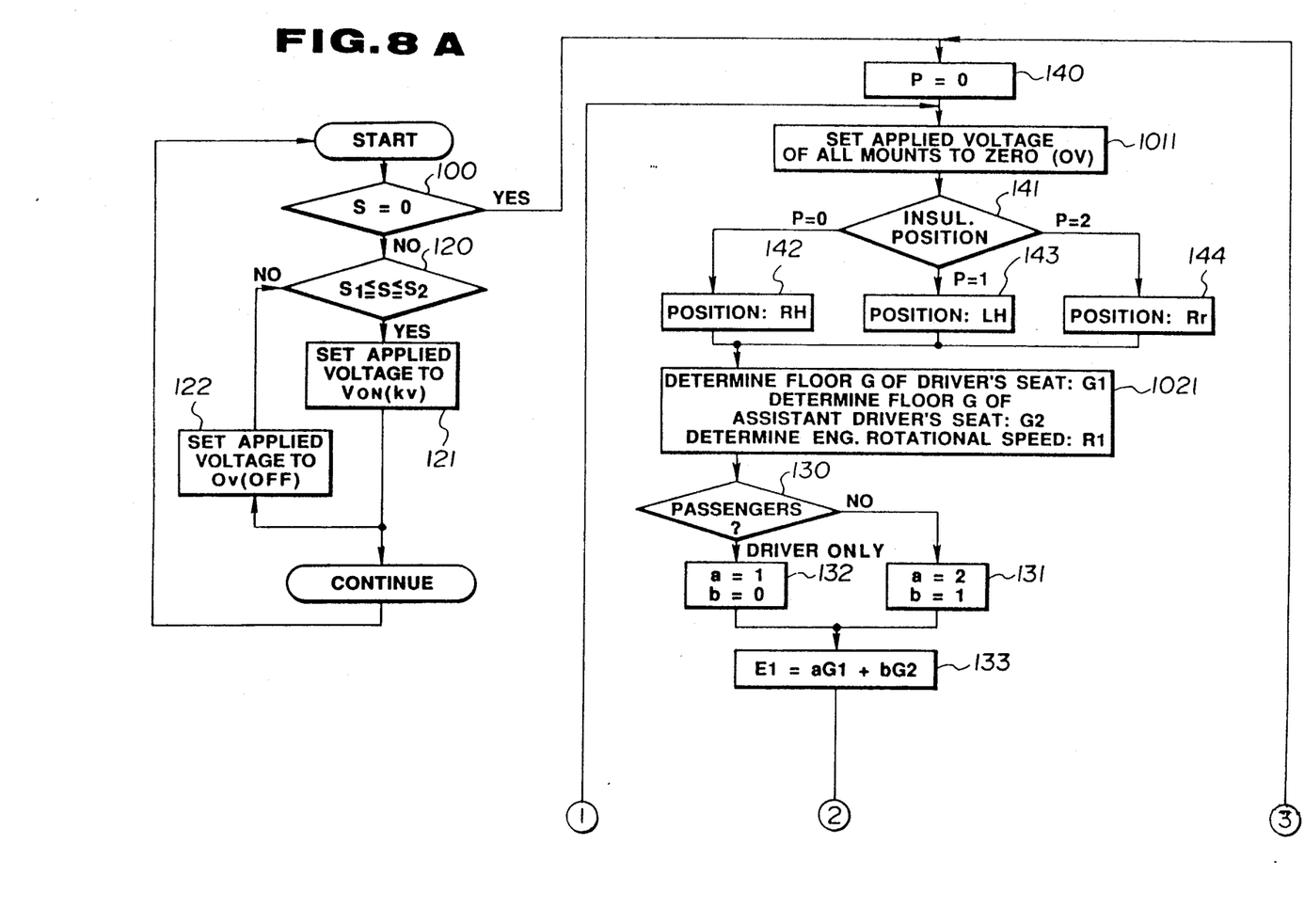
Figure 8B:
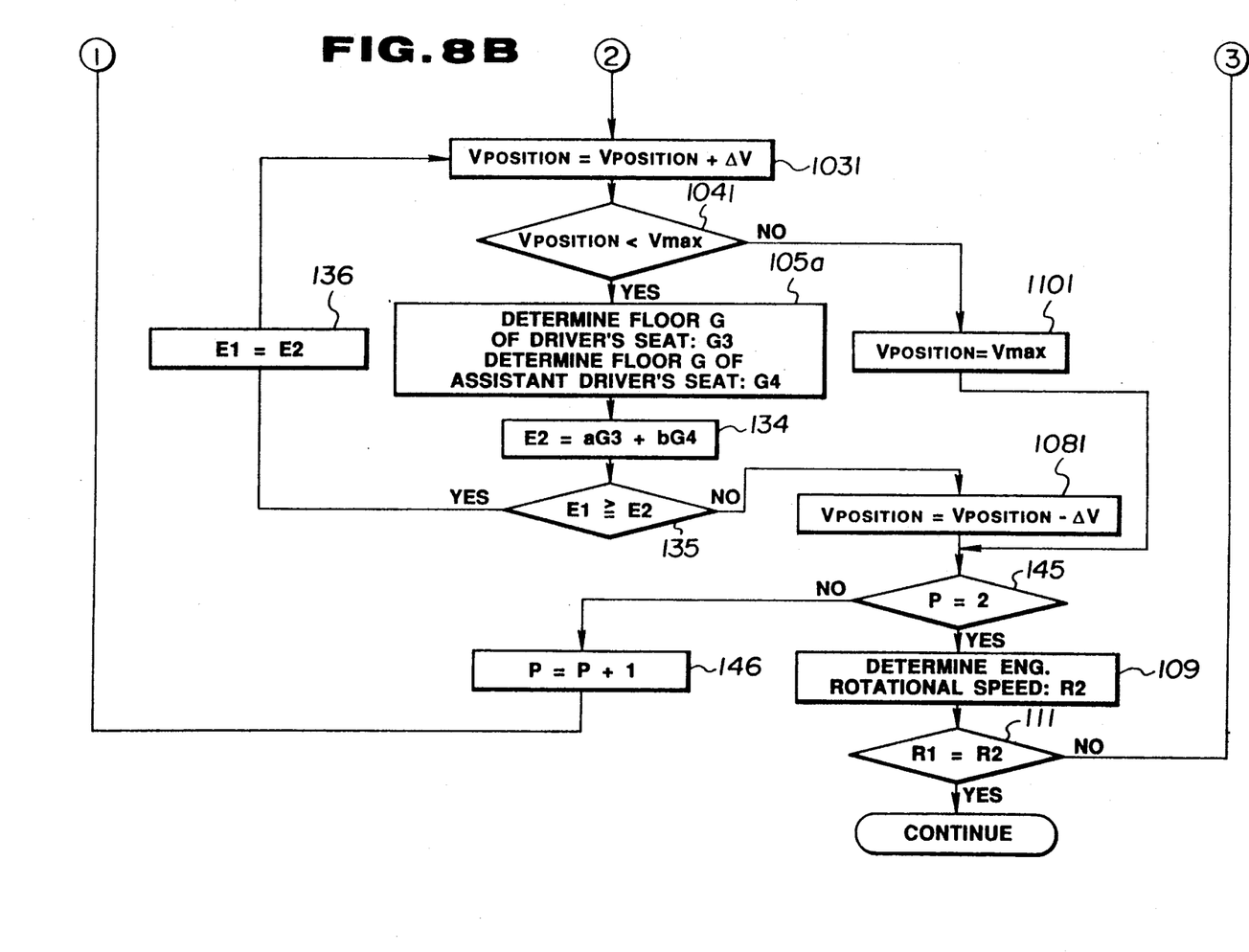

FIGS. 8A and 8B show in flow chart form the steps which characterize the operation of a third embodiment of the present invention. In this embodiment all of the mounts 10, 10a, 10b used to support the power unit 8 are of the electrically controllable type and are all controlled.

Each of the mounts 10, 10a and 10b is equipped with lateral accelerometers 52, 52a and 52b respectively, which are operatively connected with the control unit 36 as indicated in FIG. 2. Each of the mounts 10, 10a, 10b is connected with high voltage sources 38, 38a and 38b. As the routine depicted in FIGS. 8A and 8B contains steps which are identical to those found in the flow charts of FIGS. 6 and 7 and are denoted by the same numerals, redundant disclosure is omitted for the sake of brevity.

When idling conditions are detected (S=0 in step 100) the routine flows to step 140 wherein a value P is set to zero indicating that mount 10 is to be subject to control first. Viz, $P=0$ denotes mount 10 which is located at the right hand side RH of the power unit, $P=1$ denotes mount 10a located at the front left hand side LH of the power unit, and $P=2$ denotes mount 10b located at the left rear side Rr.

Following this, all of the voltages applied to the mounts are set to zero and in step 141 the current P setting is determined. As shown, depending on the instant P status the routine flows to one of steps 142, 143, and 144 wherein the output of one of the lateral acceleration sensors should be read.

Steps 1021 and 130–133 perform weighting of the outputs of the accelerometers 50, 60 and an evaluation function E1 is derived in the manner disclosed in connection with the flow chart of FIG. 7.

In step 1031 the voltage VPOSITION which is being applied for the selected one of the suspension positions RH, RL, Rr is incrementally increased by $\Delta V$. In step 1041 it is determined if VPOSITION is less than the predetermined value Vmax. In the event that VPOSITION is less than Vmax the routine goes to step 1051 while if the value is equal to or greater than Vmax the routine goes to step 1101.

In the event that the routine is directed to step 1051, the values of G3 and G4 are determined by reading the outputs of the accelerometers 50 and 60, and in step 134 a second evaluation function E2 is derived using the weighting factors a and b previously derived.

In step 135 it is determined if $E1 \geq E2$ or not. In the event that it is found that E1 is less than E2 then in step 1081 the instant VPOSITION value is decremented by $\Delta V$ while in the event that it is found that $E1 \geq E2$ then in step 136 the instant value of E1 is set equal to E2.

In step 145 it is determined if the instant position value is equal to 2 or not. In the event that the instant run is being conducted for the control of mount 10 wherein $P=0$ then in step 146 the value of P is incremented to P1, while in the event that the run is being conducted for the control of the second mount 10b and $P=1$ then P is incremented to $P=2$. In other words, in step 145 the control is switched from one mount to the next in the default order each time the routine flows through steps 1011–145.

When the voltages for each of the positions have been set the routine then goes to steps 109 and 111 wherein the engine speed is read, stored as R2, and compared with the previously recorded value of R1.

As will be appreciated, with this embodiment the vibrations which are detected at the evaluation points are used one by one to set the voltages being applied to the mounts 10, 10a and 10b in a manner which shortens the vibration vectors which converge at the evaluation points.

Accordingly, with this embodiment as the vibrations are measured and used for feedback control of the mounts from which the vibrations originate, it is possible to absorb vibrations in a manner not possible with the prior art and to allow for unit to unit variations which inevitably occur during the manufacture of the same.

FOURTH EMBODIMENT

Figure 9:
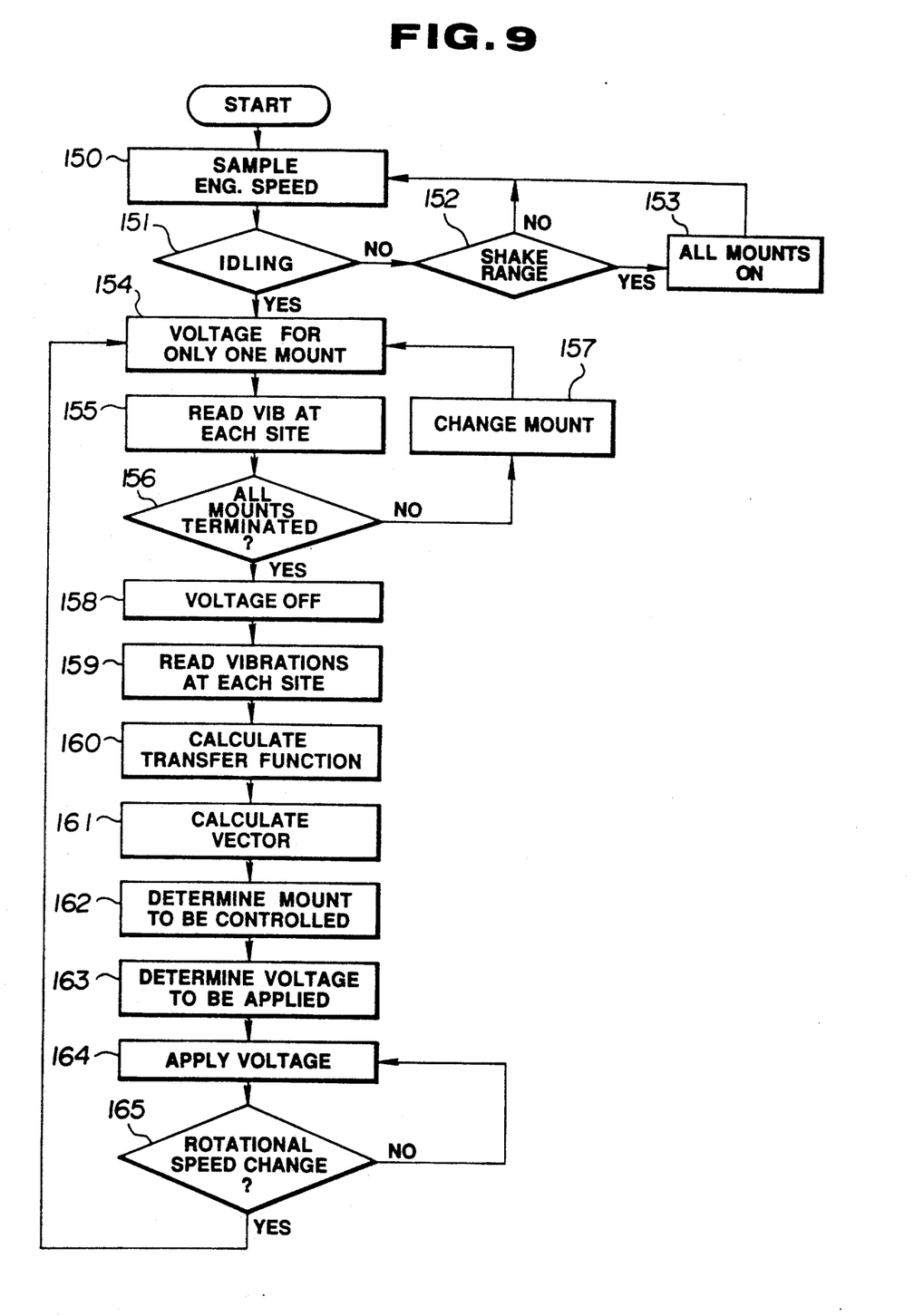
Figure 10:
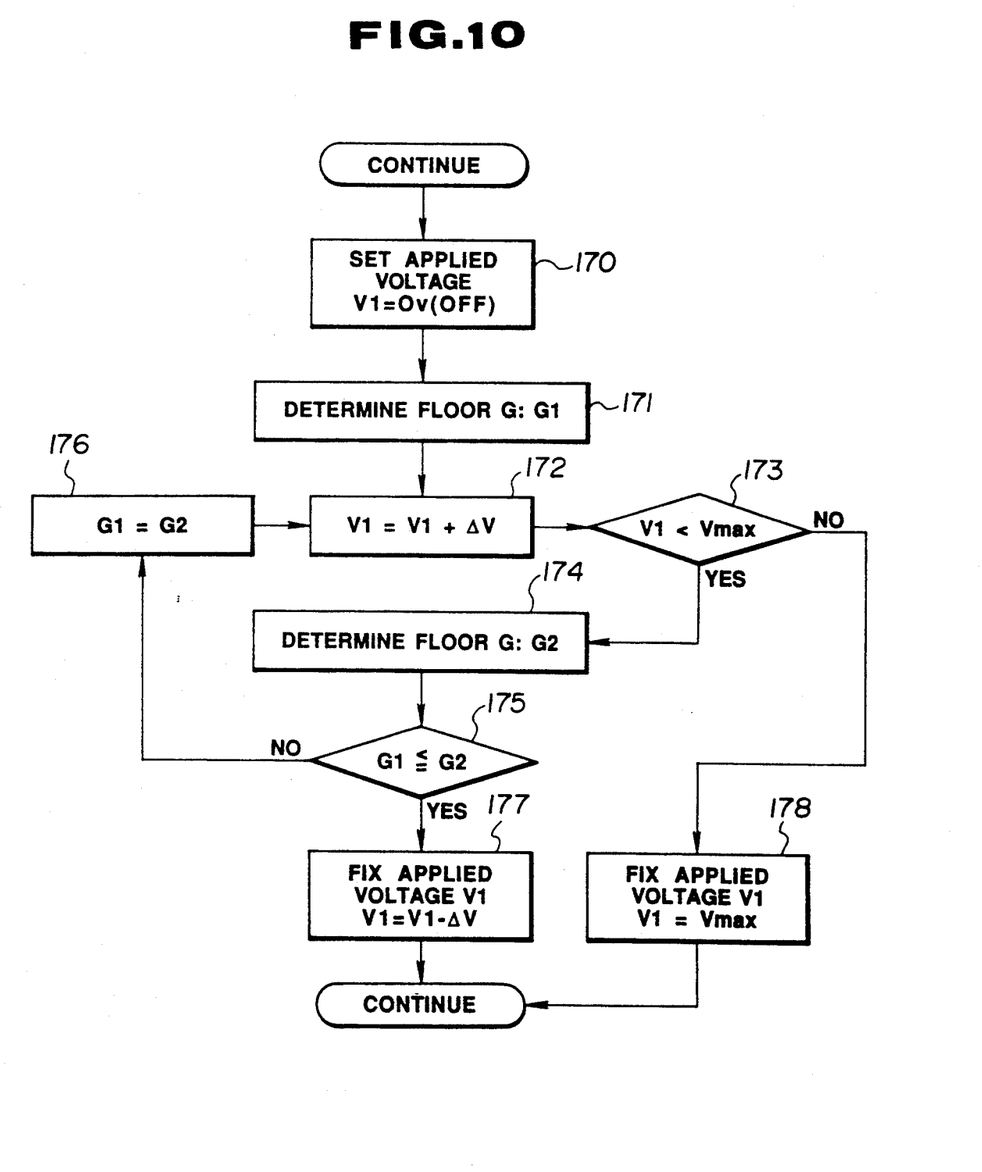

FIGS. 9 and 10 show a routine which characterizes a fourth embodiment of the present invention. In this embodiment all of the mounts are of the electrically controllable type and the one which exhibits the highest contribution to the sum of the vectors at the evaluation point is selected for control.

As shown, the first steps 150, 151 of this routine are such as to sample the output of the engine speed sensor and to determine if the engine is idling or not. If the engine is not idling, the routine flows across to step 152 wherein it is determined if the engine speed falls in a range indicative of engine shaking. In the event of an affirmative outcome the routine flows across to step 153 wherein a high voltage is applied to the orifice arrangements of all of the mounts.

When engine idling is detected the routine proceeds to step 154, and a voltage is supplied to a selected one of the mounts. Following this the vibration at each of the evaluation sites is sampled and recorded. In step 156 it is determined if all of the mounts have been selectively controlled or not. In the case of a negative outcome, the routine flows to step 157 wherein the next mount is selected and the voltage application/vibration sensing and recording procedures are repeated.

When all of the mounts have been sampled in the above manner, the routine goes to step 158 wherein all applied voltages are reduced to zero. Following this, the vibration at each of the evaluation sites is again read and recorded and in step 160 transfer functions for each of the mounts are derived and in step 161 the vibration vectors which are directed at each of the evaluation sites are calculated. Next, in step 162 the mount from which the vector which contributes the most to the resultant vector is determined. In steps 163 and 164 the appropriate voltage to be applied to the mount selected in step 162 is derived using a suitable sub-routine and applied.

In step 165 it is determined if the engine speed has changed or not. By way of example, this change can be induced by the application of a load such as an air conditioner compressor or the like. While the engine speed remains unchanged the voltage continues to be applied. However, upon a change the routine loops back to step 154.

Figure 11:
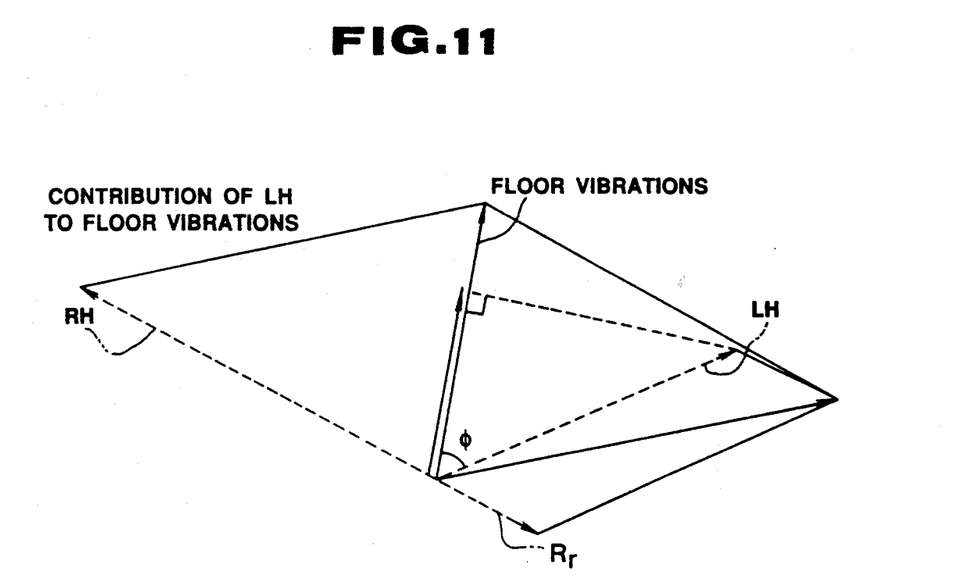
FIG. 11 is a vector diagram showing the vectors which are subject to control by the fourth embodiment of the present invention.

FIG. 11 is a diagram which shows the three derived vectors RH, LH and Rr (shown in dotted line) and the resultant vector (solid line) which produces the floor vibration. As will be appreciated the floor vibration vector has a magnitude (length) intermediate of the other three.

Figure 12:
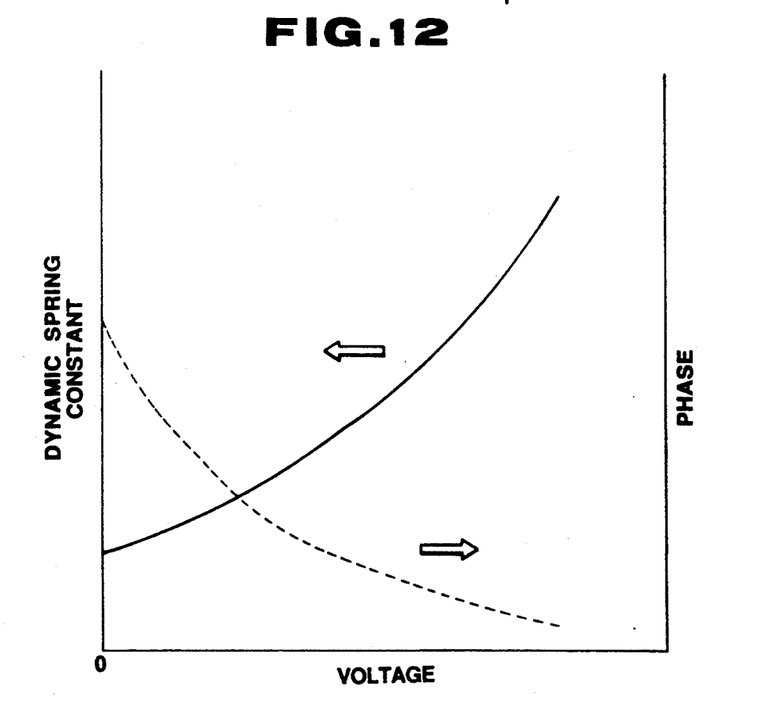
FIG. 12 is a graph showing the phase relationship between the voltage level of the control signals and the dynamic spring constant.

In FIG. 12 the solid line denotes the dynamic spring constant while the chain dotted line trace denotes the phase. As the applied voltage is increased, the dynamic spring constant increases and the phase advances, thus causing the vectors to rotate in the clockwise direction.

Accordingly, in order to reduce floor vibration it is possible to increase the voltage being applied to the mount from which a vector having a more advanced phase (clockwise deviated with respect to the floor vibration vector) and which exhibits a high contribution ratio in connection with said floor vibration.

The above mentioned contribution ratio refers to the degree of influence the vector has on the floor vibration vector. The contribution is determined by the length of the component which acts in the same direction as the floor vibration. FIG. 11 shows an example of how vector LH which originates from the front left hand engine mount 10a contributes to the floor vibration. Assuming that the phase of GLH,RH is $\phi$, then the contribution is given by IGLH,RHICos $\phi$.

Hence, it is possible to calculate the contribution of each of the vectors and decide which is the largest. In FIG. 11 the vector LH originating from front left engine mount 10a is the most advanced and thus provides the highest contribution.

Figure 13:
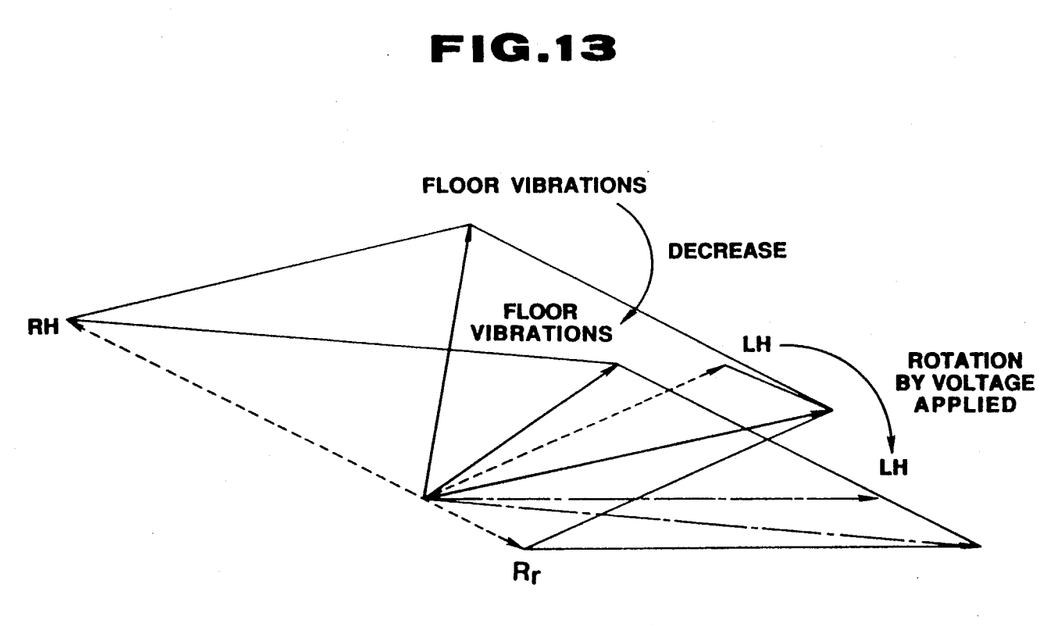
FIG. 13 is a vector diagram showing a manner in which vectors can be controlled in accordance with the fourth embodiment.

Accordingly, if the voltage applied to the front left engine mount 10a is increased, as shown in FIG. 13, the length of the vector LH increases but rotates to the right. The composite floor vibration vector is thus attenuated. At a given voltage the magnitude of the floor vibration vector reaches a minimum value. FIG. 10 shows an algorithm in flow chart form which is suitable for determining this particular voltage.

That is to say, FIG. 10 shows a routine wherein the first step is such as to set the applied voltage V1 to zero. Following this, in step 171 the floor acceleration (G) at the evaluation point is determined and recorded as G1. In step 171 the applied voltage is incremented by $\Delta V$. In step 173 the instant value of V1 is compared with a predetermined value Vmax. If V1<Vmax then the routine goes to step 174 while if V1≧Vmax the routine proceeds to step 178.

In step 174 the floor acceleration is sampled a second time and recorded as G2. In step 175, G1 and G2 are compared. If G1≦G2 then in step 176 the instant value of G1 is set equal to G2 while in the event that G1>G2 then in step 17 the applied voltage is decremented by $\Delta V$.

In the event that the routine flows to step 178, V1 is set at Vmax.

Thus, in the instant embodiment, only one engine mount need be controlled in order to reduce the floor vibration, and thus quick and easy control is facilitated.

In all of the above embodiments, as the transfer function and the vector are derived almost instantly, no discomfort is experienced even when vibration is increased by the application of a voltage.

Although the embodiments have been disclosed as utilizing the type of mount shown in FIG. 3 it will be understood that the present invention is not limited to the usage of the same and that any suitable type of electrically controllable engine mount can be used in place thereof if so desired and/or deemed appropriate.

What is claimed is:

1. A power unit mounting system for a vehicle having a chassis comprising:
   a power unit;
   a plurality of mounts supporting the power unit at a plurality of suspension points on a chassis and including a first electrically controllable mount disposed at a first of the plurality of suspension points and responsive to a first electric control signal applied thereto;
   a first vibration sensor for sensing vibration at a first predetermined vibration evaluation point on the chassis remote from the suspension points where vibration occurs due to the operation of the power unit; and
   control signal generating means for vector analysis of magnitude and phase of vibrations applied to the first vibration sensor from the power unit and for generating the first control signal for the first mount in response to the vector analysis to attenuate a resultant vector comprising a vector sum of vibrations applied to the first vibration sensor from the plurality of suspension points.

2. A vehicle as claimed in claim 1 further comprising:
a second vibration sensor for sensing the vibration at a second predetermined vibration evaluation point on said chassis said second evaluation point being distal from the plurality of suspension points and spaced from the first evaluation point, said second vibration sensor being operatively connected with said control signal generating means.

3. A vehicle as claimed in claim 2 wherein said control signal generating means includes means for generating an evaluation function based on the input from said first vibration sensor and for weighting the evaluation function based on the output of said second vibration sensor.

4. A vehicle as claimed in claim 1 further comprising a second electrically controllable mount which is disposed at a second of the plurality of suspension points and which supports said power unit on said chassis, said second mount being responsive to a second electric control signal applied thereto.

5. A vehicle as claimed in claim 4 wherein said control signal generating means includes means for discriminating which of said first and second mounts is associated with a highest contribution to the vibration sensed at said first evaluation point and for selectively controlling the selected one of said first and second mounts.

6. A power unit mounting system as claimed in claim 1 comprising a second vibration sensor mounted on the electrically controllable mount for sensing vibration of the electrically controllable mount, wherein the control signal generating means performs the vector analysis in response to vibrations sensed by the first and second vibration sensors.

7. A power unit mounting system as claimed in claim 6 wherein the first and second vibration sensors comprise accelerometers.

8. A power unit mounting system for a vehicle comprising:
a chassis;
a seat disposed on the chassis;
a power unit;
a plurality of power unit mounts supporting the power unit at a plurality of suspension points on the chassis, at least one of the mounts comprising an electrically controllable mount;
vibration discrimination means for determining vibration vectors indicating magnitude and phase of vibrations that originate from the power unit mounts and are applied to an evaluation point support by the chassis near the seat; and
control means responsive to the vibration discrimination means for controlling the electrically controllable mount based on the vibration vectors to attenuate vibration at the evaluation point.

9. A power unit mounting system for a vehicle comprising:
a chassis;
a seat disposed on the chassis;
a power unit;
a plurality of power unit mounts supporting the power unit at a plurality of suspension points on the chassis, at least one of the mounts comprising an electrically controllable mount;
a first vibration sensor disposed at an evaluation point on the chassis in a vicinity of the seat;
a second vibration sensor mounted on the electrically controllable mount;
vector determining means responsive to the first and second vibration sensors for determining a vibration vector indicating magnitude and phase of vibrations at the evaluation point transmitted from the power unit through the electrically controllable mount; and
control means for controlling the electrically controllable mount in response to the vibration vector to reduce the vibration vector.

10. A power unit mounting system as claimed in claim 9 including a floor panel supported by the chassis wherein the first vibration sensor is an accelerometer mounted on the floor panel.

11. A power unit mounting system as claimed in claim 10 wherein the second vibration sensor comprises a lateral accelerometer.

* * * * *